United States Patent [19]

Eustache et al.

[11] Patent Number: 5,271,120
[45] Date of Patent: Dec. 21, 1993

[54] WINDSHIELD WIPER AND WASHING LIQUID RESERVOIR ASSEMBLY

[75] Inventors: Jean-Pierre Eustache, Antony; Gilles Berge, Clairefontaine en Yvelines; Jean-Louis Roumegoux, Paris, all of France

[73] Assignee: Valeo Systems d'Essuyage, Montigny-le-Bretonneux, France

[21] Appl. No.: 666,366

[22] Filed: Feb. 21, 1991

[30] Foreign Application Priority Data

Feb. 22, 1990 [FR] France ............................ 90 02184

[51] Int. Cl.⁵ ............................................. B60S 1/48
[52] U.S. Cl. .............................. 15/250.01; 15/250.001; 15/250.3; 220/480; 220/481; 239/302; 239/284.1
[58] Field of Search .......... 15/250.01, 250.02, 250.03, 15/250.04, 250 A, 250 B, 250.3; 239/302, 284.1, 284.2; 220/890, 914, DIG. 13, 480, 481

[56] References Cited

U.S. PATENT DOCUMENTS

| | | | |
|---|---|---|---|
| 1,780,502 | 11/1930 | Otto | 15/250.01 |
| 1,993,684 | 3/1935 | Rogers | 15/250.01 |
| 3,187,924 | 6/1965 | Marcus | 220/480 |
| 3,447,185 | 6/1969 | Zichichi et al. | 15/250.01 |
| 4,150,681 | 4/1979 | Howarth, Jr. | 15/250.01 |
| 4,318,510 | 3/1982 | Koike | 15/250 A |

FOREIGN PATENT DOCUMENTS

| | | | |
|---|---|---|---|
| 0321330 | 6/1989 | European Pat. Off. | 15/250.01 |
| 0360100 | 3/1990 | European Pat. Off. | 15/250.01 |
| 2329118 | 1/1974 | Fed. Rep. of Germany | 15/250.01 |
| 2578211 | 9/1986 | France | 239/302 |
| 2219932 | 12/1989 | United Kingdom | 15/250.35 |

*Primary Examiner*—Timothy F. Simone
*Assistant Examiner*—Gary K. Graham
*Attorney, Agent, or Firm*—Dennison, Meserole, Pollack & Scheiner

[57] ABSTRACT

A windshield wiper assembly comprises a drive mechanism for at least one windshield wiper arm, together with a reservoir for a windshield washing liquid. The drive mechanism comprises a support structure, on which are mounted a motor and a linkage for transmission of motion between a spindle driven by the motor and at least one windshield wiper arm. The support structure is arranged to be secured on to the body of a vehicle, in particular an automotive vehicle. Pumping means are provided to project washing liquid from the reservoir on to the glass being wiped. The reservoir is so designed as to be accommodated substantially within the space envelope defined by the drive mechanism, and it is rigidly secured to the support structure of this mechanism so as to form an assembly therewith.

9 Claims, 2 Drawing Sheets

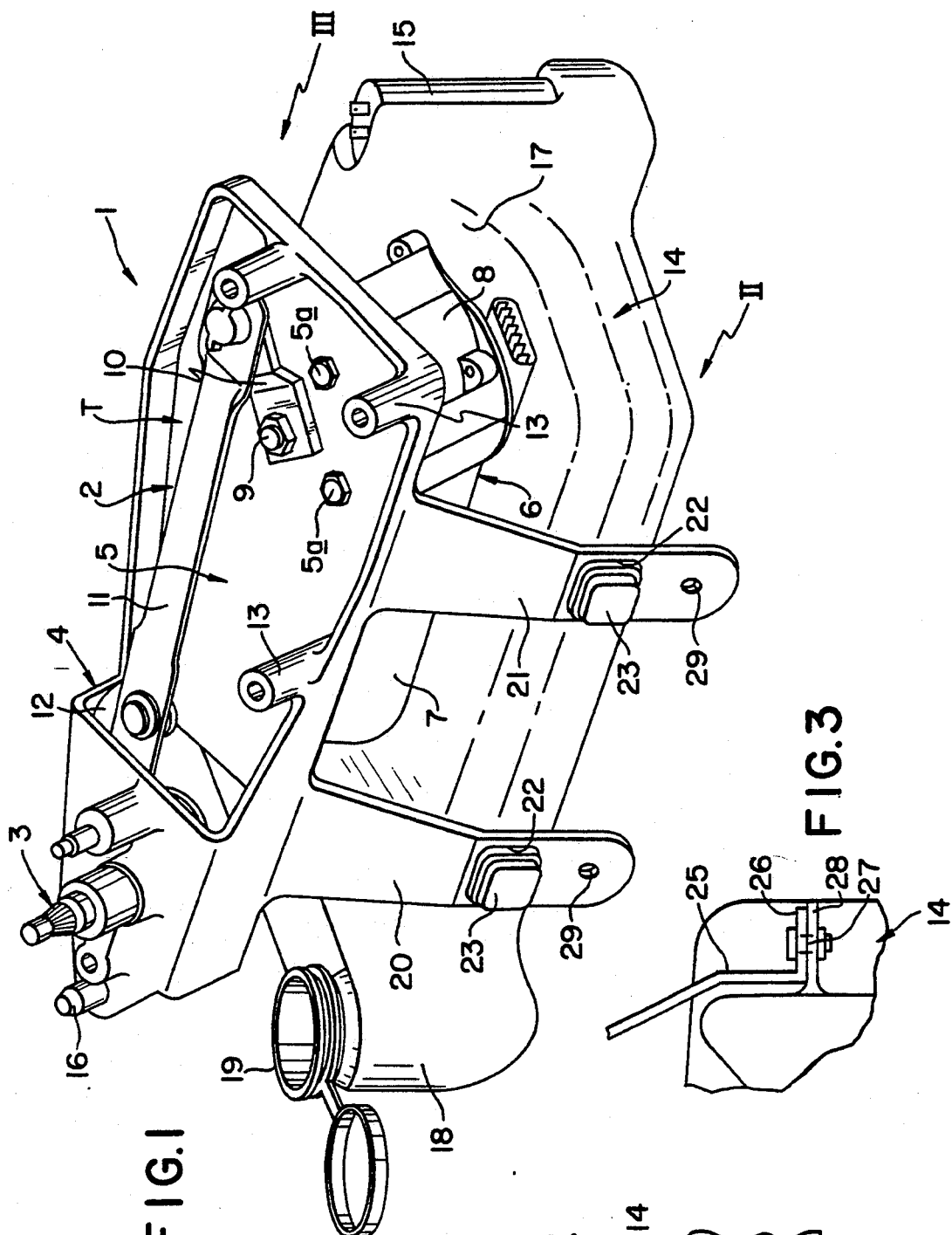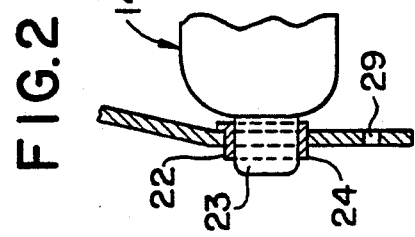

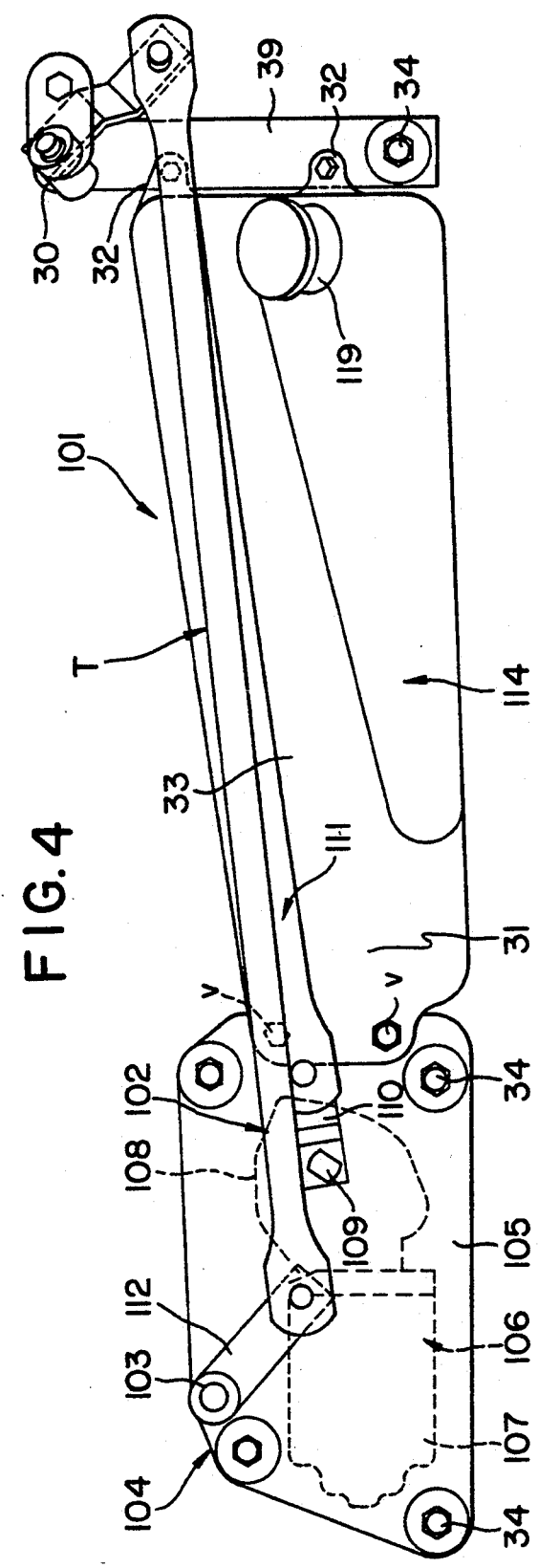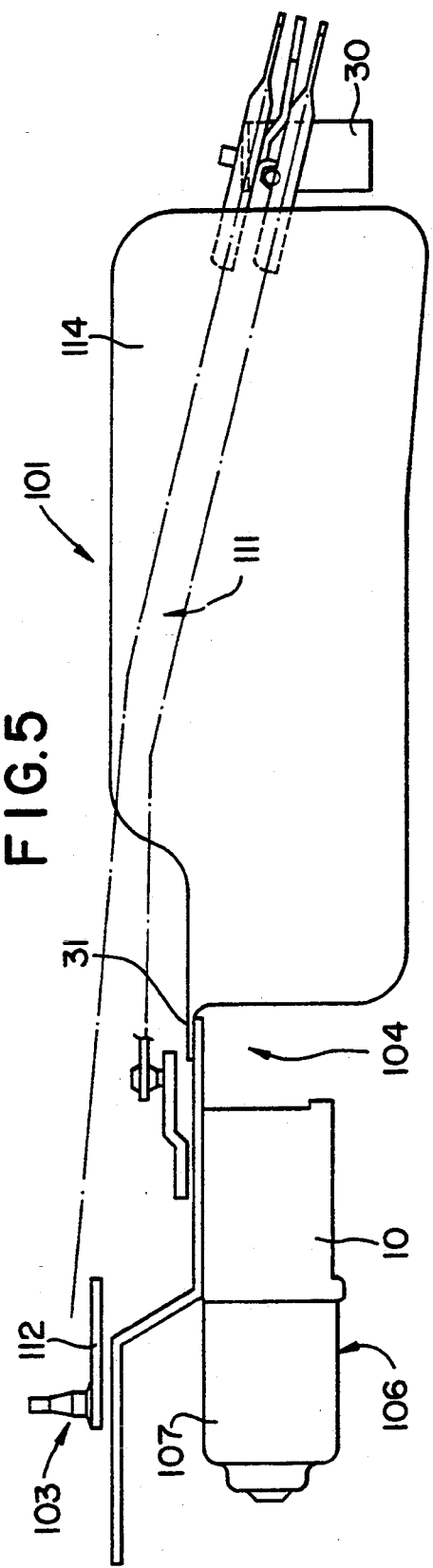

WINDSHIELD WIPER AND WASHING LIQUID RESERVOIR ASSEMBLY

FIELD OF THE INVENTION

This invention relates to a windshield wiper apparatus of the kind comprising: a drive mechanism for at least one windshield wiper arm, the drive mechanism including a support structure, on which are mounted a motor and a linkage for transmitting motion between a drive spindle which is driven by the motor and at least one windshield wiper arm, the support structure being secured to the body of a vehicle, in particular an automotive vehicle; and a reservoir for containing a washing liquid, with pumping means being provided to enable the washing liquid to be projected on to the glass during operation of the windshield wiper.

BACKGROUND OF THE INVENTION

It is desirable, especially in the automobile industry, that such a windshield wiper apparatus should be capable of being installed in a simple and rapid manner on the vehicle. It is also desirable that the space occupied by the apparatus should be as small as possible.

OBJECTS OF THE INVENTION

A main object of the invention is to provide a windshield wiper apparatus which responds better than hitherto to the requirements mentioned above, while remaining simple and economical in design.

SUMMARY OF THE INVENTION

In accordance with the invention, a windshield wiper apparatus of the kind defined above is characterised by the fact that the reservoir for washing liquid is so designed as to fit as far as possible within the space defined by the drive mechanism, and in that the reservoir is rigidly secured to the support structure of the mechanism in such a way as to form a single unit with the support structure.

Generally, the support structure comprises a base plate on one side of which the motion transmitting linkage is mounted, while the motor is mounted so as to project from the other side of the base plate, this base plate being elongated in the general direction in which the linkage extends. Preferably, the reservoir for the washing liquid has a shape which is elongated in the same direction in which the linkage extends.

In one form of apparatus according to the invention, the reservoir has a concave upper external wall and is adapted to receive in its concavity a part of the motor of the drive mechanism, the reservoir extending substantially below the base plate of the support structure.

The base plate may include on a longitudinal edge thereof, which is in particular directed forwardly, two feet which are spaced away from each other and which extend downwardly and include holes for receiving projecting portions of the reservoir, while on the opposite longitudinal edge at least one foot is provided, this latter foot being directed downwardly and being adapted to be secured, for example by means of a screw, on a support element provided on the reservoir.

The support structure includes fixing means, such as threaded bosses, which are orientated substantially at right angles to the mean plane of the support plate, whereby the assembly of support structure and reservoir can be secured on to the body of the vehicle.

In another form of windshield wiper apparatus in accordance with the invention, the reservoir for washing liquid serves as a spacer for the support structure and is secured on a short side to a base plate having a length which is less than the length of the linkage, while on its other short side the reservoir is rigidly secured to a cross member carrying an articulation element for the motion transmitting linkage. The reservoir is thus accommodated within the length of the drive mechanism, and effectively forms part of its support structure, whereas in the first mentioned form of apparatus according to the invention, the reservoir was accommodated within the height or thickness of the drive mechanism.

In this second form of apparatus according to the invention, the reservoir acts as a spacer between the base plate and the cross member, the whole apparatus being secured to the structure of the vehicle by means of the base plate and cross member.

Further embodiments within the scope of the invention are also possible, as will become apparent from the description given below, by way of example only, of embodiments of the invention which will be described with reference to the accompanying drawings.

BRIEF DESCRIPTION OF THE DRAWINGS

FIG. 1 is a perspective view of a windshield wiper apparatus in a first embodiment of the invention.

FIG. 2 is a view in cross section showing a detail of FIG. 1, as seen in the direction of the arrow II in FIG. 1.

FIG. 3 is a view of a detail lying in the rear part of the structure shown in FIG. 1, as viewed in the direction of the arrow III in FIG. 1.

FIG. 4 is a plan view of another embodiment of the invention.

Finally, FIG. 5 is a view in elevation of the apparatus shown in FIG. 4, but with certain parts cut away.

DESCRIPTION OF PREFERRED EMBODIMENTS OF THE INVENTION

Referring first to FIG. 1 of the drawings, this shows a windshield wiper apparatus 1 which includes a drive mechanism 2 for a windshield wiper arm (not shown) which is mounted on the end of a windshield wiper arm spindle 3 for driving the arm. The drive mechanism 2 includes a support structure 4 which consists basically of a base plate 5. Motor means 6 are fastened by means of screws 5a below the base plate 5. The motor means 6 consist principally of an electric motor 7, the axis of rotation of which is substantially parallel to the longitudinal direction of the base plate 5, together with a speed reducer 8 having a drive spindle at right angles to the mean plane of the base plate 5, through which it extends. The end 9 of the drive spindle of the reducer 8 drives a crank 10 which is mounted on the opposite side of the base plate 5 from the motor 7 and reducer 8. The crank 10 is part of a transmission linkage T, which also includes a connecting rod 11 which is pivoted on the end of the crank 10 furthest from the drive spindle 9. The other end of the connecting rod 11 is pivoted on a member 12 which is coupled to the wiper arm spindle 3, and which communicates to the latter an alternating rotational movement in response to the continuous rotation of the drive spindle 9.

The support structure 4 is arranged to be secured on to the structure of a vehicle, and includes threaded bosses 13, the axis of each of which is at right angles to the mean plane of the base plate 5, in order to effect this attachment.

The apparatus 1 further includes a reservoir 14 for glass washing liquid, and pumping means submerged in the reservoir, with only its electric drive motor 15 projecting out of the reservoir. The washer pump motor 15 is arranged with its shaft vertical, in a concave portion of the reservoir wall which is substantially cylindrical having vertical generatrices and which is formed at one corner of the reservoir 14. The pumping means are connected through flexible tubing, not shown in the drawings, to a nozzle 16 for projecting the washing liquid on to the glass which is to be swept.

The liquid reservoir 14 is so designed as to fit as far as possible within the confines or envelope of the space defined by the drive mechanism 2, and is connected rigidly to the support structure 4 of that mechanism.

In the embodiment shown in FIG. 1, the reservoir 14 has the form of a rectangular parallelepiped, and is situated below the base plate 5. The reservoir has a concave upper wall 17 in which lies a part of the motor means 6, projecting below the base plate 5.

Viewed in a horizontal plane, the overall projected contour of the reservoir 14 lies close to that of the support structure 4, in such a way that the longitudinal and transverse extent of the whole corresponds substantially to that of the structure 4. In the vertical direction, the projecting part of the motor means 6 fits within the concavity of the reservoir 14, so that the overall vertical height of the assembly is only slightly increased.

The reservoir 14 includes, on the side opposite the washer pump motor 15, a portion 18 which is extended forwards beyond the support structure 4. The portion 18 has an orifice 19 in its top, for filling the reservoir 14. The orifice 19 lies outside the contour of the structure 4, in order to facilitate pouring of the liquid into the reservoir.

The base plate 5 has on its front longitudinal edge reservoir connecting points comprising two feet 20 and 21 which are spaced away from each other and which are directed downwardly. Each foot 20, 21 has a hole 22 (see FIG. 2) for receiving projecting portions 23 that are provided on the front face of the reservoir 14. A protective sleeve 24, which may for example be of elastomeric material, is threaded around each projecting portion 23 and is engaged in the corresponding opening 22.

A third connecting point between the reservoir 14 and the support structure 4 is provided behind the structure 4. This connecting point comprises a further foot 25 (see FIG. 3) which projects downwardly and which has a horizontally extending terminal flange 26. The flange 26 is arranged to be secured, for example by means of a screw 27 extending through a hole provided for this purpose in the flange 26, on to a horizontal support wall 28 of the reservoir 14.

The feet 20 and 21 may include holes, for example as indicated at 29, near their lower ends, to enable further elements to be attached.

Assembly of the reservoir 14 with the support structure 4 is carried out rapidly, since all that it involves is to engage the projecting portions 23 in the holes 22 and to secure the foot 25 on the support wall 28 of the reservoir. In this way a unitary assembly is obtained which is able to be mounted easily and rapidly on the structure of the vehicle itself by means of the threaded bosses 13.

Referring now to FIGS. 4 and 5, these show a modified embodiment of the windshield wiper apparatus. Those elements of this apparatus which are similar, or which perform similar functions, to elements already described with reference to FIGS. 1 to 3, are designated by reference numerals which are the same as the latter but with 100 added. The description of such elements need not be repeated, or need only be mentioned briefly.

In the apparatus 101 shown in FIGS. 4 and 5, the reservoir 114 for containing washing liquid serves as a spacer forming a structural part of the windshield wiper mechanism support structure 104, and is comprised within the length corresponding to the general direction in which the linkage T extends. The base plate 105 is here much shorter than the linkage T, considered in that general direction. The reservoir 114, the shape of which is that of a parallelepiped, is secured at one of its short sides to the base plate 105, for example by screws v. At its other short side, the reservoir 114 is rigidly secured to a cross member 39, which is a separate component of the support structure 104 and which carries an articulation element 30 of the linkage T.

The reservoir 114 is secured to the base plate 105 by means of a continuous flange 31 which is provided on the upper wall of the reservoir 114. The flange 31 has holes for accommodating the screws v. On the opposite short face, ears 32, arranged substantially at mid height, are fixed with respect to the wall of the reservoir 114 and enable the cross member 39 to be secured by means of screws.

The transverse width of the reservoir 114 (in a direction parallel to the mean direction of the cross member 39) is substantially equal to that of the base plate 105. In the vertical direction, as seen in FIG. 5, the height of the reservoir 114 is only slightly greater than the maximum overall height of the support structure 104 including the motor means 106.

The upper wall of the reservoir 114 has a hollow zone 33, directed rearwardly so as to provide a space in which the downwardly bent connecting rod 111 can move.

The base plate 105, reservoir 114 and cross member 39, forming a unitary sub-assembly, are secured to the body of the vehicle, for example at the base plate 105 and cross member 39, by means of screws such as those indicated at 34, cooperating with threaded holes which are provided in the base plate and in the cross member.

Whatever particular embodiment is adopted, the windshield wiper apparatus with the washer liquid reservoir, described above, constitute a unit which is easy to instal and which is of reduced overall dimensions.

What is claimed is:

1. A windshield wiper apparatus comprising a drive mechanism, for at least one windshield wiper arm, and a reservoir, the drive mechanism comprising an elongated support structure forming a base plate which has a first and second longitudinal edge, motor means mounted on the support structure, a drive spindle rotatably carried by the support structure and coupled with the motor means so as to be rotatably driven thereby, at least one windshield wiper arm spindle rotatably carried by the support structure, and a linkage coupled between the drive spindle and said at least one windshield wiper arm spindle for transmitting said rotary motion of said drive spindle to said wiper arm spindle, said support structure including means for securing said support structure to the body of a vehicle, said drive mechanism configured to define a space envelope, the apparatus further comprising pumping means operatively connected to the reservoir to project washing liquid from the reservoir on to a glass surface during wiping of the glass surface, and means for rigidly attaching the reservoir to the support structure so as to form an assembly, the reservoir has an upper external wall forming a concavity which receives a portion of the motor means therein, the reservoir extending substantially below the support structure so as to fit substantially within the space envelope defined by the drive mechanism, the base plate further comprising a pair of first feet spaced from each other and projecting downwardly from the first longitudinal edge, and at least one second foot projecting from the second longitudinal edge, the reservoir having projecting elements and a support element, the first pair of feet having holes for engaging said projecting elements to secure them to the reservoir, and the at least one second foot being arranged to be secured to said support element.

2. The windshield wiper apparatus according to claim 1, wherein the base plate has a first side and a second side, the linkage being disposed on the first side of the base plate and the motor means being disposed so as to project from the second side, the base plate being elongated in the direction in which the linkage extends and the reservoir has a shape which is elongated in the same direction.

3. Apparatus according to claim 1, wherein said means for securing are threaded bosses projecting substantially at right angles from the base plate.

4. A windshield wiper and washing liquid reservoir assembly comprising a drive mechanism, for at least one windshield wiper arm, and a reservoir for washing liquid, said reservoir has an external upper wall forming a concavity, the drive mechanism comprising a support structure forming a base plate which has first and second sides, motor means being received in said concavity and mounted on the support structure, a drive spindle rotatably carried by the support structure and coupled with the motor means so as to be rotatably driven thereby, at least one windshield wiper arm spindle rotatably carried by the support structure, and a linkage coupled between the drive spindle and said at least one windshield wiper arm spindle for transmitting said rotary motion of said drive spindle to said wiper arm spindle said support structure including means for securing said support structure to the body of a vehicle, said linkage being disposed on the first side and said reservoir extending substantially below the second side of the base plate, said drive mechanism configured to define a space envelope, pumping means operatively supported by the reservoir to project washing liquid from the reservoir on to a glass surface, and means for attaching the reservoir to the support structure, the reservoir being configured so as to substantially fit within the space envelope defined by said drive mechanism to permit securing of the assembly to a vehicle body as a single unit.

5. Apparatus according to claim 4, wherein the base plate has a first longitudinal edge and a second longitudinal edge opposite to the first longitudinal edge, the base plate further comprising two first feet spaced from each other and projecting from the first longitudinal edge, and at least one second foot projecting from the second longitudinal edge, said feet being directed downwardly, the reservoir having projecting elements and a support element, the first two feet having holes for engaging said projecting elements to secure them to the reservoir, and the second foot being arranged to be secured to said support element.

6. Apparatus according to claim 4, wherein said means for securing are threaded bosses projecting substantially at right angles from the base plate.

7. A windshield wiper and washing liquid reservoir assembly comprising a drive mechanism, for at least one windshield wiper arm, and an elongated reservoir for washing liquid, said elongated reservoir has an external upper wall forming a hollow zone, the drive mechanism comprising a support structure, motor means mounted on the support structure, a drive spindle rotatably carried by the support structure and coupled with the motor means so as to be rotatably driven thereby, at least one windshield wiper arm spindle rotatably carried by the support structure, and a linkage coupled between the drive spindle and said at least one windshield wiper arm spindle for transmitting said rotary motion of said drive spindle to said wiper arm, said support structure comprising means for securing the support structure to the body of a vehicle, an elongated base plate which is substantially shorter than the linkage between the drive spindle and the windshield wiper arm spindle for transmitting said rotary motion, and said support structure comprising a cross member separate from the base plate, the linkage including an articulation element carried by the cross member, the reservoir having ends and an upper wall, said reservoir being attached at one of its ends to the cross member and at its other end to the base plate, so as to act as a spacer between the cross member and the base plate.

8. Apparatus according to claim 7, wherein the base plate and the cross member include said means for securing the apparatus to the body of the vehicle.

9. Apparatus according to claim 7, wherein the linkage includes a connecting rod, the upper wall of the reservoir defining said hollow zone for providing free space for movement of the connecting rod therein.

* * * * *